Feb. 16, 1943. D. F. JORGENSEN 2,311,178
MOUSE TRAP
Filed April 13, 1940
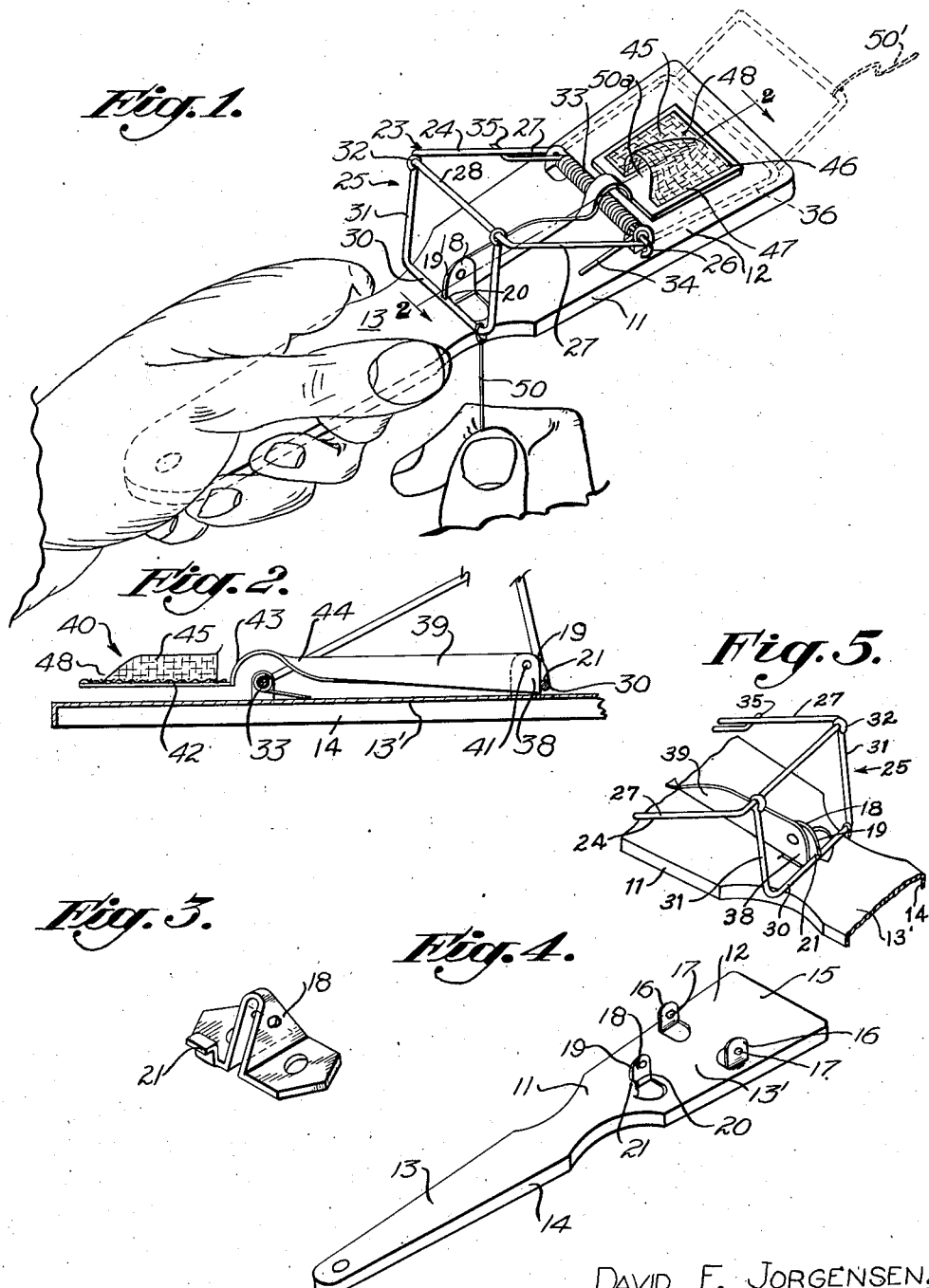
DAVID F. JORGENSEN,
INVENTOR.
BY
ATTORNEY.

Patented Feb. 16, 1943

2,311,178

UNITED STATES PATENT OFFICE 2,311,178

MOUSETRAP

David F. Jorgensen, Temple City, Calif.

Application April 13, 1940, Serial No. 329,505

13 Claims. (Cl. 43—81.5)

My invention relates in general to rodent traps, and relates in particular to a mouse trap of simple and effective construction.

It is an object of the present invention to provide a rodent trap which may be easily set and which may be set without manual engagement of the trap jaw or striker element; having a handle whereby it may be held during setting and whereby it may be handled or placed without danger to the user thereof; having a simple form of bait container which requires no tying on of the bait; and having means whereby the rodent may be released from the trap without touching the animal or any part of the trap by which it is gripped.

It is an object of the invention to provide a trap having a rearwardly projecting handle and having a flexible strand, such as a piece of string by which the striker element or movable jaw of the trap may be moved away from the base and into a retracted position, and cooperating therewith the trap has a simple latching means to hold the jaw in retracted or "set" position, without the necessity of arranging a plurality of sensitive trigger elements in cooperative positions. Traps of the general type now employed have a jaw member which is secured or set in retracted position by means of a bar element which passes over the jaw, and is engaged by a shoulder on a trigger to which the bait is attached. The setting of traps of this character requires considerable care in placing the bar and trigger in engagement, and in the setting of traps of this character, the fingers are often exposed to injury as the result of inadvertent release of the jaw holding mechanism. My present invention employs a latching means which is essentially automatic in its operation and which co_operates in producing a trap which may be set without need for placing any part of the user's hand in a position where they might be injured by release of the jaw from raised or retracted position relative to the base.

A further object of the invention is to provide a trap having a simple trigger member cooperating with the latch of the trap in such manner that the trigger does not have to be manually placed in a set position, but which is automatically moved into such set position when the jaw of the trap is moved into its retracted position.

A further object of the invention is to provide a rodent trap having a latch means providing a shoulder or hook which is engaged by a part of the jaw organization, thereby holding the jaw organization in retracted position, this latch means having a part operating to move the engaging portion of the jaw organization from engagement with the shoulder, in response to movement of the bait holder of the trap by the rodent attempting to gain access to the bait.

A further object of the invention is to provide a bait holder having an open-work bait container, preferably made from screen fabric, and having a projecting shelf or step in surrounding relation to the container, upon which shelf or step the rodent normally climbs in attempting to gain access to the bait in the container. In the preferred practice of the invention the bail holder is made of metal and has an opening at the rear end thereof through which the bait may be inserted into the open-work container, after which heat may be applied to the bait material to toast the same so that it will emit food scent to attract rodents.

A further object of the invention is to provide a rodent trap which may be readily disinfected or sterilized by dipping the front end thereof into hot water, the handle of the device being so arranged that this may be accomplished without inconvenience, such handle being arranged with an opening whereby the trap may be hung up to dry after sterilization, without necessity of engaging any portion of the trap other than the handle.

A further object of the invention is to provide a trap of the character described having a jaw or striker element with a link adapted to be moved into engagement with the latch element of the device, to hold the jaw in retracted position.

Further objects and advantages of the invention will be brought out in the following part of the specification.

Referring to the drawing which is for illustrative purposes only:

Fig. 1 is a perspective view showing a preferred embodiment of the rodent trap and illustrating the simple method of setting the same.

Fig. 2 is a slightly enlarged fragmentary section taken as indicated by the line 2—2 of Fig. 1.

Fig. 3 is a perspective view of an alternative bracket for use in the latch means.

Fig. 4 is a perspective view of the base and handle organization.

Fig. 5 is a fragmentary perspective view illustrating the latch means of the rodent trap.

In Fig. 4 I show a base member 11 formed so as to provide a base proper 12 and a projecting portion to form a handle 13. The base 11 may be made of any material now employed for this purpose, but in the preferred embodiment of my invention I show the base member 11 as comprising a metal stamping in the form of an inverted pan, such stamping being made by the bending of sheet metal of light weight so as to provide an upper wall 13' and a downwardly projecting peripheral flange 14, the base member 11 thus having the form of an inverted shallow pan. Spaced rearwardly from the front end 15 of the base, a pair of hinge brackets 16 are provided, these hinge brackets consisting of metal tongues stamped and bent upwardly from the top wall 13' of the metal base. These hinge brackets have aligned openings 17 therein.

A latch bracket 18 projects upward from the top wall 13' of the base member 11 at a point rearward from the hinge brackets 16, and preferably at or adjacent the front end of the handle 13. This latch bracket consists of an upstanding metal wall, which may be readily sheared and bent upwardly from the top wall 13' of the base member 11. This latch bracket 18 preferably has a rounded upper edge 19 which slopes downward, in the direction of the handle 13, toward the upper wall 13' of the base member 11, there being a notch 20 in the rearward portion of the latch bracket 18 to provide a downwardly faced shoulder or hook 21, the purpose of which will be later explained.

As shown in Fig. 1 the rodent trap has a jaw element 23 comprising a jaw or striker member 24 and a link or stirrup member 25. The jaw 24 comprises a rectangular frame bent from a piece of steel wire, such frame having an inner or hinge portion 26 which projects through the opening 17 in the hinge bracket 16, side portions 27 and an outer bar portion 28 which is preferably parallel to the hinge portion 26. The link 25 comprises a piece of wire bent so as to provide a bar portion 30 with a pair of legs 31 extending from the end thereof, the extremities of these legs 31 having loops 32 to pass around the end portions of the bar 28 of the jaw 24, to pivotally connect the link 25 to the jaw 24 with which it cooperates in forming the jaw element 23. A coil spring 33 encloses a greater portion of the part 26 of the jaw 24, one end of this spring 33 bearing against the base member 12 as indicated at 34, and the other end 35 of the spring 33 engaging one of the side portions 27 of the jaw 24 so that the torsional force of the spring will be applied to the jaw to urge it forcibly from the retracted or "set" position in which it is shown in full lines in Fig. 1 to the trapping or holding position thereof shown by dotted lines 36.

The latch means of the trap includes the previously described bracket 18 having the shoulder 21 which is engaged by the central portion of the bar 30, as shown in Figs. 1 and 2, to hold the jaw element in retracted position. The tension in the legs 31 of the link 25, produced by the clockwise force of the spring 33 applied to the jaw 24, holds the bar 30 tightly against the shoulder 21 so that it will not inadvertently slip from latched position. The latch of the trap incorporates means for moving the bar 30 of the link 25 out of engagement with the shoulder 21, such means comprising an abutment or lever element 38 connected or forming part of a lever or trigger 39 which at the forward end thereof carries a bait holder 40. The lever 39 is pivotally connected on a horizontal transverse axis to the bracket 18 by means of a pivot member 41 which may consist of a rivet extended through openings in the upper portion of the bracket 18 and the upper rearward portion of the lever 39. The lever 39 may have a plate 42 integrally formed at the forward end thereof, and the forward end of the lever may be bent upward from the rearward edge of the plate 42 as indicated at 43, so that the forward end of the lever 39 will pass over the spring 33, and the lever 39 may be twisted through an angle of 90°, as shown at 44, so that the rearward end of the lever 39 will lie in a vertical plane to correspond to the vertical position of the bracket 18. The plate 42 comprises the support for the bait holder 40, and thereon has an open work bait container 45 produced by the bending upward of the central portion of a rectangular or square piece of wire mesh screen 46, edge portions 47 of this screen lying flat on the plate 42 so as to provide adjacent the sides and the front end 48 of the container 45 laterally extended step or shelf means of a character to be readily engaged by the claws of a rodent who attracted by the scent of the bait will climb up on the step in attempting to gain access to the bait which has been placed in the bait container 45 through the opening 50a at the rear end thereof.

The weight and downward thrust of the rodent's forelegs as he attempts to gain access to the bait will move the bait holder downward depressing the plate 42 toward the base 12 and swinging the trigger 39 downward about the rivet 41, and moving the abutment element portion 38 of the lever 39 rearward to force the bar 30 rearward out of engagement with the shoulder 21. The jaw 24 then swings under the torsional stress of the spring 33, in a quick snap action, from the position shown in full lines in Fig. 1 to the position shown in dotted lines thereon, striking and holding the rodent against escape.

The ease of setting and handling the trap will be perceived from the following. The flexible strand 50 is grasped by one hand when it is in the dotted line position 50' thereof, the handle 13 of the trap being at this time grasped in the other hand. An upward pull on the flexible member 50 will raise the jaw element 23 from engagement with the forward portion of the base 12, and by then pulling the strand 50 rearwardly and then downwardly, the jaw element 23 may be readily swung into the position thereof shown in full lines in Fig. 1, and the downward pull on the string 50 will move the bar 30 of the link 35 into a position adjacent the rear edge of the latch bracket 18. By a slight downward and forward movement, applied through the strand 50, the bar 30 may be moved forward under the shoulder 21 to engage the portion 38 of the lever 39 and to rotate the lever 39 upward around the pivot 41, thereby raising the bait holder 40 from the surface of the base 11. Accordingly, the raising of the bait holder into a set or active position occurs automatically as the result of moving the bar 30 associated with the jaw element 23 into its latched position under the shoulder 21. The trap may be then placed as desired without exposure of the fingers. Release of the latch is accomplished by downward pressure on the bait holder 40 to swing the lever 39 downward so that the portion 38 of the lever 39 will force the bar 30 out from under the shoulder 21. Release of the rodent which has been caught is accomplished merely by applying an outward pull through the strand 50 to the jaw element 23 to move the same away from the forward portion of the base 11 whereupon the rodent will drop out of the trap.

I claim as my invention:

1. In a rodent trap, the combination of: a base having a portion extending rearwardly therefrom to provide a handle for said base; a jaw element hingedly connected to said base at a point spaced from the front end thereof; spring means to urge said jaw element toward engagement with the front end of said base; a bait holder positioned movably relative to the front portion of said base; a latch on the rearward portion of said base having a stationary shoulder to engage and hold said jaw element in retracted position against the force of said spring means; and means extending from said bait holder to said latch to effectuate disengagement of said jaw element from said stationary shoulder as the result of movement of said bait holder.

2. In a rodent trap, the combination of: a base having a portion extending rearwardly therefrom to provide a handle for said base; a jaw element hingedly connected to said base at a point spaced from the front end thereof, said jaw element comprising a link; spring means to urge said jaw element toward engagement with the front end of said base; a bait holder positioned movably relative to the front portion of said base; a latch on the rearward portion of said base for engagement with said link to hold said jaw element in retracted position against the force of said spring means; and means extending from said bait holder to said latch to effectuate release of said jaw element as the result of movement of said bait holder.

3. In a rodent trap, the combination of: a base having a portion extending rearwardly therefrom to provide a handle for said base; a jaw element hingedly connected to said base at a point spaced from the front end thereof, said jaw element comprising a link; spring means to urge said jaw element toward engagement with the front end of said base. a bait holder positioned movably relative to the front portion of said base, said bait holder comprising a perforate bait container and a shelf extending laterally therefrom and positioned for engagement by a rodent attempting to reach bait in said container; a latch on the rearward portion of said base for engagement with said link to hold said jaw element in retracted position against the force of said spring means; and means extending from said bait holder to said latch to effectuate release of said jaw element as the result of movement of said bait holder.

4. In a rodent trap, the combination of: a base having a portion extending rearwardly therefrom to provide a handle for said base; a jaw element hingedly connected to said base at a point spaced from the front end thereof, said jaw element comprising a link; spring means to urge said jaw element toward engagement with the front end of said base; a bait holder positioned movably relative to the front portion of said base; a latch on the rearward portion of said base for engagement with said link to hold said jaw element in retracted position against the force of said spring means; means extending from said bait holder to said latch to effectuate release of said jaw element as the result of movement of said bait holder; and a strand of flexible material connected to said link and adapted to be gripped by one hand of the user, while said handle is held in the other hand of the user, to bring said link into engagement with said latch.

5. In a rodent trap, the combination of: a base having a portion extending rearwardly therefrom to provide a handle for said base; a jaw element hingedly connected to said base at a point spaced from the front end thereof, said jaw element comprising a link; spring means to urge said jaw element toward engagement with the front end of said base; a bait holder positioned movably relative to the front portion of said base, said bait holder comprising a perforate bait container and a shelf extending laterally therefrom and positioned for engagement by a rodent attempting to reach bait in said container; a latch on the rearward portion of said base for engagement with said link to hold said jaw element in retracted position against the force of said spring means; means extending from said bait holder to said latch to effectuate release of said jaw element as the result of movement of said bait holder; and a strand of flexible material connected to said link and adapted to be gripped by one hand of the user, while said handle is held in the other hand of the user, to bring said link into engagement with said latch.

6. In a rodent trap, the combination of: a base having a portion extending rearwardly therefrom to provide a handle for said base; a jaw element hingedly connected to said base at a point spaced from the front end thereof; spring means to urge said jaw element toward engagement with the front end of said base; a bait holder positioned movably relative to the front porton of said base; a latch on the rearward portion of said base to hold said jaw element in retracted position against the force of said spring means, said latch comprising a stationary shoulder engageable by a part of said jaw element so as to restrain said jaw element from movement, and means for moving said part out of engagement with said shoulder; and means extending from said bait holder to said latch to effectuate movement of said jaw element out of engagement with said stationary shoulder as the result of movement of said bait holder.

7. In a rodent trap, the combination of: a base having a portion extending rearwardly therefrom to provide a handle for said base; a jaw element hingedly connected to said base at a point spaced from the front end thereof, said jaw element comprising a striker member and a link consisting of a bar with legs projecting from the ends thereof, said legs being pivotally connected to said striker member; spring means to urge said jaw element toward engagement with the front end of said base; a bait holder positioned movably relative to the front portion of said base; a latch on the rearward portion of said base, said latch comprising a shoulder engageable by said bar of said link whereby said jaw element is restrained from movement, and means for forcing said bar from engagement with said shoulder; and means extending from said bait holder to said latch to effectuate release of said jaw element as the result of movement of said bait holder.

8. In a rodent trap, the combination of: a base having a portion extending rearwardly therefrom to provide a handle for said base; a jaw element hingedly connected to said base at a point spaced from the front end thereof, said jaw element comprising a striker member and a link consisting of a bar with legs projecting from the ends thereof, said legs being pivotally connected to said striker member; spring means to urge said jaw element toward engagement with the front end of said base; a bait holder positioned movably relative to the front portion of said base; a latch on the rearward portion of said base, said latch comprising a shoulder engageable by said bar of said link whereby said jaw element is restrained from movement, and means for forcing said bar from engagement with said shoulder; means extending from said bait holder to said latch to effectuate release of said jaw element as the result of movement of said bait holder; and a flexible strand connected to said link to apply movement to said jaw element to move the same away from said base and to move said bar of said link into engagement with said shoulder to set the trap.

9. In a rodent trap, the combination of: a base; a jaw element movably secured to said base so as to be moved from a retracted position to a gripping position; spring means for urging said jaw element from said retracted position to said gripping position; releasable means for holding said jaw element in said retracted position against the action of said spring means; a bait holder supported movably on said base, said bait holder comprising a perforate bait container and a shelf extending laterally therefrom to receive downward pressure from a rodent attempting to reach said bait container, said shelf being prepared so as to present a roughened wall for engagement by the feet of the rodent; and means acting in response to movement of said bait holder to release said releasable means.

10. In a rodent trap, the combination of: a base having a portion extending rearwardly therefrom to provide a handle for said base; a jaw element hingedly connected to said base at a point spaced from the front end thereof; spring means to urge said jaw element toward engagement with the front end of said base; a bait holder positioned movably relative to the front portion of said base between active and inactive positions; a latch on the rearward portion of said base having a stationary shoulder to engage and hold said jaw element in retracted position against the force of said spring means; and means extending from said bait holder to said latch to effectuate disengagement of said jaw element from said stationary shoulder as the result of movement of said bait holder, said last named means being so formed that it will move said bait holder into active position in response to engagement of said shoulder by said jaw element.

11. In a rodent trap, the combination of: a base; a jaw element hingedly connected to said base at a point spaced from the front end thereof; spring means to urge said jaw element toward engagement with the front end of said base; a bait holder positioned movably relative to the front portion of said base; a latch on the rearward portion of said base having a stationary shoulder to engage and hold said jaw element in retracted position against the force of said spring means; and means extending from said bait holder to said latch to effectuate disengagement of said jaw element from said stationary shoulder as the result of movement of said bait holder.

12. In a rodent trap, the combination of: a base; a jaw element hingedly connected to said base at a point spaced from the front end thereof, said jaw element comprising a link; spring means to urge said jaw element toward engagement with the front end of said base; a bait holder positioned movably relative to the front portion of said base; a latch on the rearward portion of said base for engagement with said link to hold said jaw element in retracted position against the force of said spring means; and means extending from said bait holder to said latch to effectuate release of said jaw element as the result of movement of said bait holder.

13. In a rodent trap, the combination of: a base; a jaw element hingedly connected to said base at a point spaced from the front end thereof, said jaw element comprising a striker member and a link consisting of a bar with legs projecting from the ends thereof, said legs being pivotally connected to said striker member; spring means to urge said jaw element toward engagement with the front end of said base; a bait holder positioned movably relative to the front portion of said base; a latch on the rearward portion of said base, said latch comprising a shoulder engageable by said bar of said link whereby said jaw element is restrained from movement, and means for forcing said bar from engagement with said shoulder; and means extending from said bait holder to said latch to effectuate release of said jaw element as the result of movement of said bait holder.

DAVID F. JORGENSEN.